US011814251B1

(12) United States Patent
Maier (10) Patent No.: US 11,814,251 B1
(45) Date of Patent: Nov. 14, 2023

(54) SPEED REDUCER AND SPEED REDUCER SYSTEM FOR A CONVEYOR (71) Applicant: Toyota Motor Engineering & Manufacturing North America, Inc., Plano, TX (US)

(72) Inventor: T. J. Maier, Oakland City, IN (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 17/828,716

(22) Filed: May 31, 2022

(51) Int. Cl.
*B65G 47/88* (2006.01)
(52) U.S. Cl.
CPC .................. *B65G 47/8823* (2013.01)
(58) Field of Classification Search
None
See application file for complete search history.

(56) References Cited

U.S. PATENT DOCUMENTS

| 3,970,180 A * | 7/1976 | Schlottmann | B65G 47/8823 |
| | | | 193/35 A |
| 4,809,836 A * | 3/1989 | Zilber | B65G 13/075 |
| | | | 193/35 A |
| 2020/0339364 A1 | 10/2020 | Eckerström et al. | |

* cited by examiner

*Primary Examiner* — William R Harp
(74) *Attorney, Agent, or Firm* — Christopher G. Darrow; Darrow Mustafa PC (57) ABSTRACT

A speed reducer for a gravity roller conveyor system is provided. The speed reducer includes a mounting member and an engagement member rotatably connected to the mounting member and structured to be rotatable to a first rotational position and to a second rotational position. A damper is connected to the mounting member and is structured to bias the engagement member to the first rotational position. A retraction mechanism is operably connected to the engagement member and is structured to be operable to rotate the engagement member to the second rotational position against a biasing force exerted by the damper on the engagement member when an object moving along the conveyor becomes stalled, thereby enabling the object to move along the conveyor past the engagement member. A speed reducer system incorporating the speed reducer is also described.

9 Claims, 10 Drawing Sheets

SPEED REDUCER AND SPEED REDUCER SYSTEM FOR A CONVEYOR

TECHNICAL FIELD

The embodiments disclosed herein relate to roller conveyor systems and, more particularly, to a system designed to reduce the speed of an object moving along a conveyor and to prevent the object from becoming stalled or stuck on the conveyor.

BACKGROUND

Gravity roller conveyors are structured to propel objects between locations on the conveyor by providing a slope or vertical height difference between these locations, thereby enabling gravitational forces to propel the objects along the length of the conveyor. An object moving along a gravity roller conveyor may sometimes gather excessive speed. In such cases, it becomes necessary to dissipate some of the momentum of the moving object to prevent damage to the object and/or the conveyor. Various speed-reducing devices and mechanisms have been devised to slow an object moving along a gravity roller conveyor. However, if an object having a relatively low travel speed and/or mass (i.e., a "low-momentum" object) encounters such a speed-reducing device, the device may dissipate so much of the object's momentum that the object becomes undesirably stalled at a single location on the conveyor, thereby producing a product flow stoppage.

SUMMARY

In one aspect of the embodiments described herein, a speed reducer system for a conveyor system is provided. The system includes a speed reducer having a mounting member and an engagement member rotatably connected to the mounting member and structured to be rotatable to a first rotational position and to a second rotational position. A damper is connected to the mounting member and is structured to bias the engagement member toward the first rotational position. A retraction mechanism is operably connected to the engagement member and is structured to be operable to rotate the engagement member to the second rotational position against a biasing force exerted by the damper on the engagement member, responsive to a control signal. A processor is communicably coupled to the retraction mechanism. A memory is communicably coupled to the processor and stores a retraction mechanism control module including computer-readable instructions that when executed by the processor cause the processor to generate the control signal responsive to a determination that at least a portion of an object supported by the conveyor for movement along the conveyor has resided in a predetermined volume of space with respect to the speed reducer for a period of time greater than a predetermined period of time.

In another aspect of the embodiments described herein, a speed reducer for a conveyor system is provided. The speed reducer includes a mounting member and an engagement member rotatably connected to the mounting member and structured to be rotatable to a first rotational position and to a second rotational position. A damper is connected to the mounting member and is structured to exert a force biasing the engagement member to the first rotational position. A retraction mechanism is operably connected to the engagement member and is structured to be operable to rotate the engagement member to the second rotational position against the biasing force exerted by the damper on the engagement member.

In yet another aspect of the embodiments described herein, a method of controlling a speed of an object moving along a conveyor is provided. The method comprises a step of positioning a portion of an engagement member in a path of movement of the object, the engagement member being rotatable to a first rotational position in which the portion of the engagement member is in the path of movement, and to a second rotational position in which the engagement member is out of the path of movement, the engagement member being operably connected to a damper structured to exert a force resisting rotation of the engagement member out of the first rotational position, the engagement member being configured to rotate out of the first rotational position responsive to contact of the moving object with the portion of engagement member, thereby reducing the speed of the moving object, when a momentum of the moving object is sufficient to cause rotation of the engagement member against the force exerted by the damper, the engagement member also being operably connected to a retraction mechanism configured to rotate the engagement member to the second rotational position after movement of the object along the conveyor stops, thereby enabling further movement of the object along the conveyor, when the momentum of the object contacting the engagement member is insufficient to cause rotation of the engagement member to the second rotational position against the force exerted by the damper.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

A speed reducer for a gravity roller conveyor system is provided. The speed reducer includes a mounting member and an engagement member rotatably connected to the mounting member and structured to be rotatable to a first rotational position and to a second rotational position. A damper is connected to the mounting member and is structured to bias the engagement member to the first rotational position. A retraction mechanism is operably connected to the engagement member and is structured to be operable to rotate the engagement member to the second rotational position against a biasing force exerted by the damper on the engagement member when an object moving along the conveyor becomes stalled at a single location on the conveyor. An object detection mechanism may detect when the object is stalled. A processor and a retraction mechanism control module may be operably connected to the object detection mechanism. Responsive to the object becoming stalled, the processor may execute control module instructions to generate a control signal causing operation of the retraction mechanism to rotate the engagement member to its second rotational position, thereby enabling the object to move along the conveyor past the engagement member.

Figure 1:
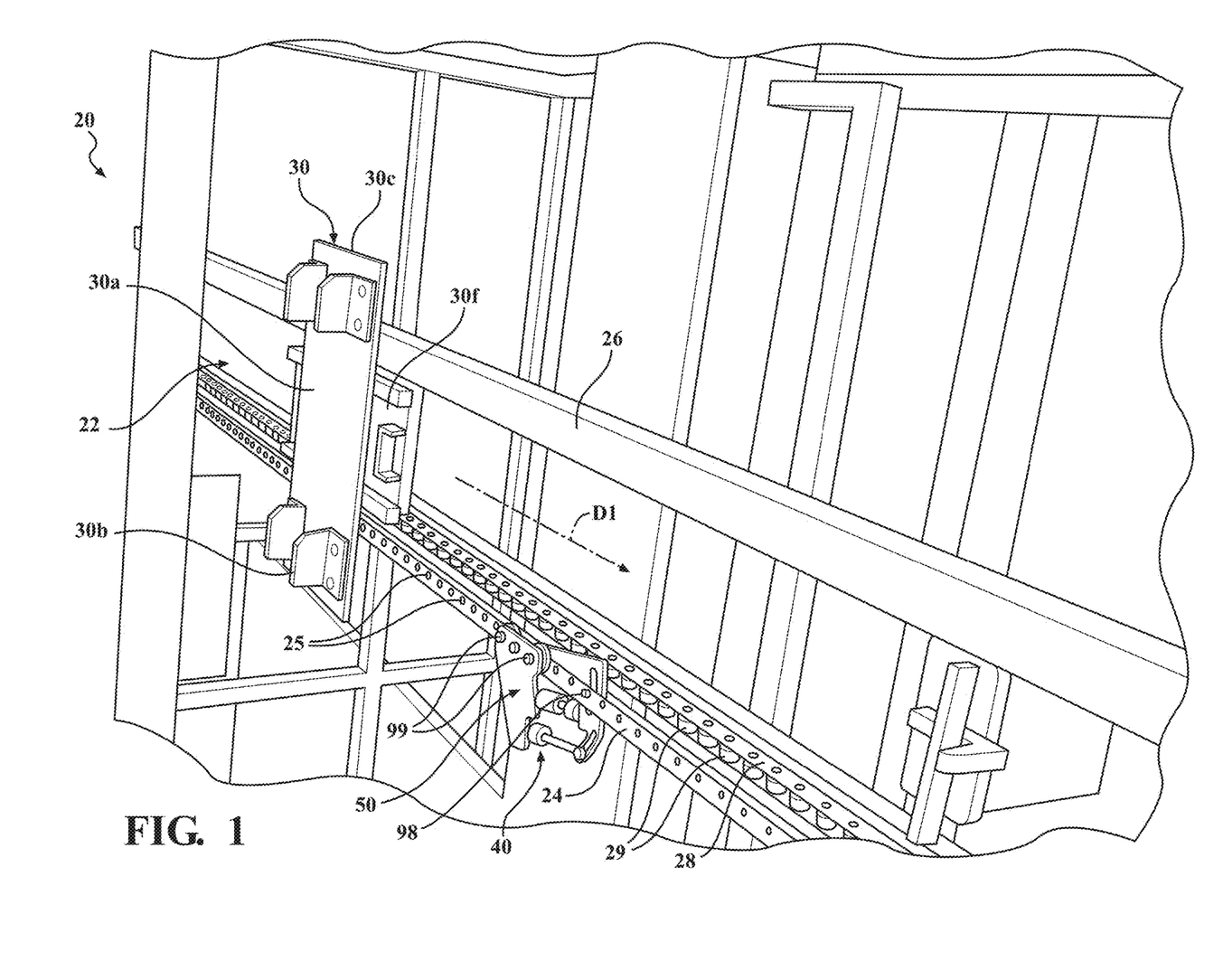
FIG. 1 is a schematic perspective view of a portion of a roller conveyor system including a speed reducer system in accordance with an embodiment described herein.

FIG. 1 is a schematic perspective view of a portion of a roller conveyor system 20 including a speed reducer system 40 in accordance with an embodiment described herein. In one or more arrangements, the conveyor system 20 may include a conveyor 22 having a first frame member 24 and a second frame member 26 positioned opposite (and extending parallel to) the first frame member 24. The first frame member 24 may have a series of holes 25 formed therealong to enable attachment of any of a variety of devices or accessories to the conveyor 22.

A roller rail 28 may be spaced apart from the first frame member 24 and rigidly connected to the first frame member. The roller rail 28 may include a series of spaced-apart rollers 29 rotatably mounted thereon. As is known in the pertinent art, the rollers 29 may have coplanar rotational axes and equal outer diameters and may be configured to support a cassette or other object 30 so that the object may move along the rollers 29 in a desired direction of movement of the object (for example, in direction D1 in the example of FIG. 1). The frame members 24, 26 and the roller rail 28 may be canted or sloped along portions thereof to urge the object 30 in the desired direction of motion under the force of gravity. Other conveyor designs and arrangements are also possible.

In the arrangement shown in FIG. 1, the object 30 in contact with the rollers 29 is a tray or "cassette" positionable on the conveyor 22 and serving as a platform upon which other objects may be placed for transport. The cassette 30 may have a base portion 30a structured to support items for transport along the conveyor 22. One side 30b of the cassette 30 may be supported by the rollers mounted on roller rail 28, while an opposite side 30c of the cassette 30 may be supported by another set of rollers (not shown in FIG. 1) mounted to the base portion 30a and positioned to roll along the second frame member 26 as the cassette 30 proceeds in direction D1. If desired, lateral guides or borders (not shown in FIG. 1) may be mounted along side edges of the conveyor 22 or along sides 30b, 30c of the cassette 30 to restrict lateral movement (i.e., movement perpendicular to the desired direction of movement D1) of the cassette 30 as it travels along the conveyor 22.

In one or more arrangements, a bumper 30f may extend outwardly from a side of the cassette base portion 30a facing in the desired direction of movement D1 of the cassette 30. The bumper 30f may be structured to contact a hard stop (not shown) positioned to halt motion of the cassette 30 in direction D1. The bumper 30f may also be structured to contact a speed reducer 50 of speed reducer system 40 positioned in a path of movement of the cassette 30, for purposes described herein. The speed reducer 50 (or a portion thereof) may be considered to be in a path of movement of the cassette 30 when a portion of an engagement member 54 of the speed reducer 50 is positioned so that a portion of the cassette 30 will directly, physically contact the portion of the engagement member 54 when the engagement member is in a first rotational position during motion of the cassette 30 along the conveyor 22 in the desired direction of movement D1.

Figure 2:
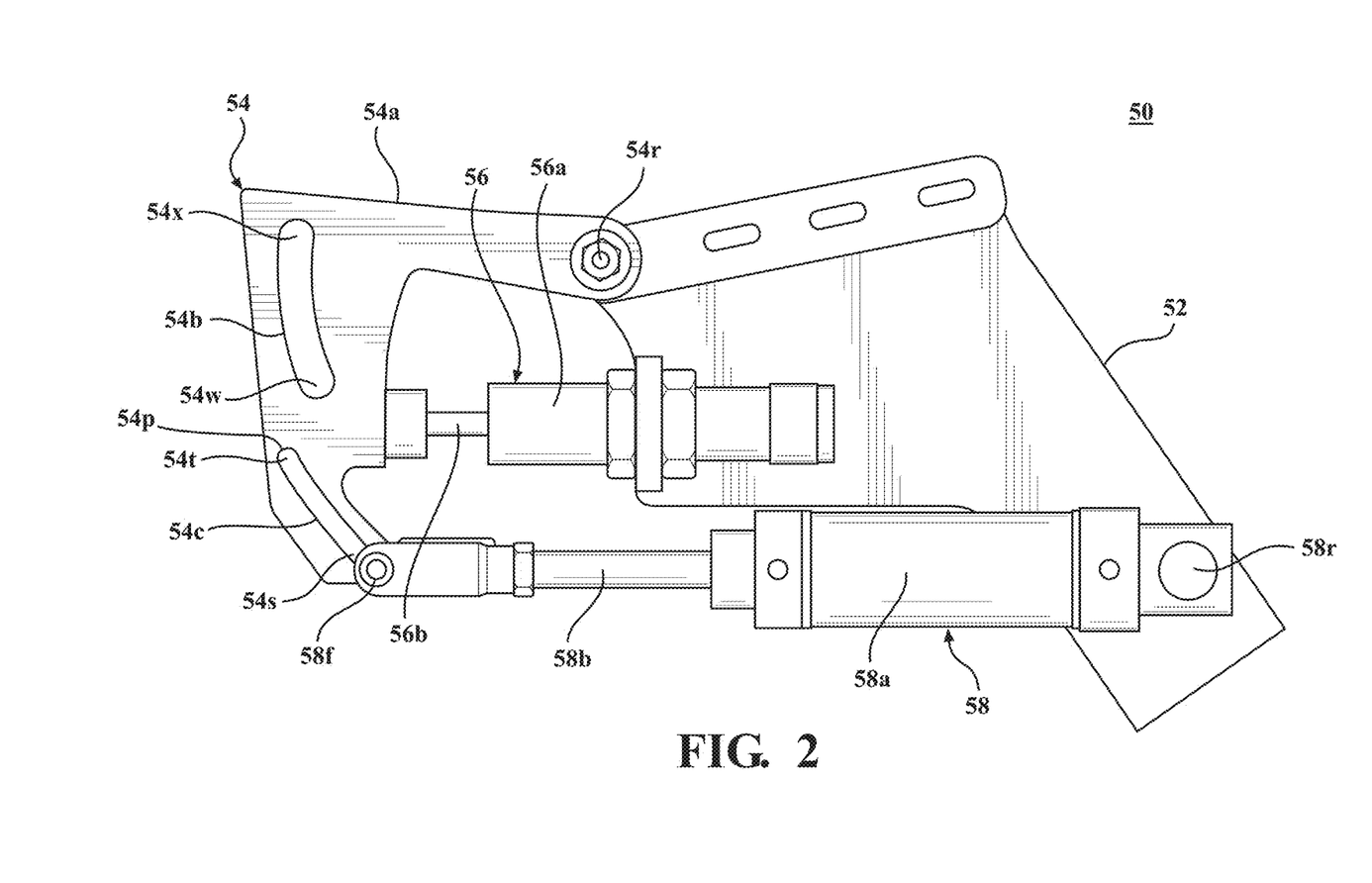
FIG. 2 is a schematic plan view of a speed reducer in accordance with an embodiment described herein.

Referring to the drawings, speed reducer 50 may be rigidly attached to the conveyor first frame member 24, for example, by bolts 99. FIG. 2 is a schematic plan view of a speed reducer in accordance with an embodiment 50 described herein. As used herein, the term "speed reducer" refers to a mechanism structured to reduce the speed of an object such as cassette 30 moving along a conveyor.

In one or more arrangements, the speed reducer 50 may include a mounting member 52 to which other elements of the speed reducer 50 may be mounted as described herein. The mounting member 52 may be structured to be fixedly connectible to the first frame member 24 to enable attachment of the speed reducer 50 to the frame member 24. In certain examples, the mounting member 52 may be in the form of a flat plate fabricated to include the mounting member features described herein.

An engagement member 54 may be rotatably connected to the mounting member 52. The engagement member 54 may be rotatable to a first rotational position shown in FIGS. 3A, 3B, 3D, 4A and 4C. The first rotational position may be specified so as to position the engagement member 54 in the path of movement of the cassette 30. When the engagement member 54 is in the first rotational position (i.e., in the path of movement of the cassette 30), contact of the cassette 30 with the engagement member 54 may operate to either stop movement of the cassette 30 along the conveyor 22 or to markedly slow the speed of cassette 30 along the conveyor.

Figure 3A:
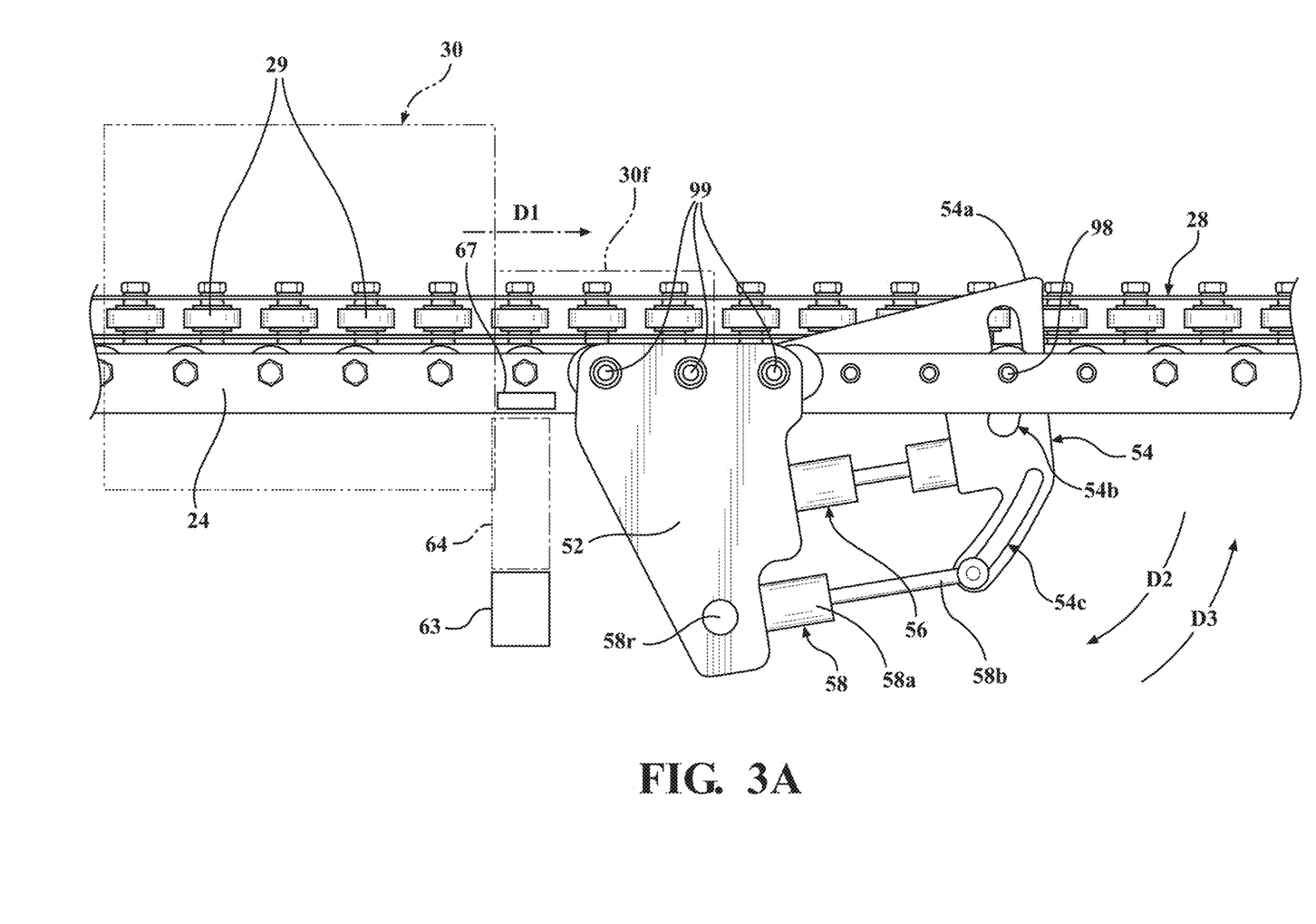
FIG. 3A is a schematic plan view of a portion of the conveyor system of FIG. 1 on which an embodiment of the speed reducer is mounted, showing an engagement member of the speed reducer in its first rotational position and movement of a cassette along the conveyor prior to contacting the speed reducer.

The engagement member 54 may also be rotatable to a second rotational position. The second rotational position may be specified so that the engagement member 54 is not in the path of movement of the cassette 30. Examples of the engagement member 54 in its second rotational position are shown in FIGS. 3C and 4B. In one mode of operation, as described herein, the second rotational position of the engagement member 54 may be achieved by the cassette 30 contacting the engagement member 54 when the engagement member 54 is in the first rotational position to produce a resulting rotation of the engagement member 54 from the first rotational position to the second rotational position. In another mode of operation, the second rotational position of the engagement member 54 may be achieved by a retraction mechanism 58 of the speed reducer 50 acting on the engagement member 54 to rotate the engagement member 54 from the first rotational position to the second rotational position. When the engagement member 54 is in the second rotational position, the cassette 30 may roll along the conveyor 22 without being blocked or impeded by the engagement member 54, aside from a degree of friction caused by scraping of the cassette 30 against an edge of the engagement member as the cassette 30 moves along the conveyor 22 past the engagement member 54. In certain examples, the engagement member 54 may be in the form of a flat plate fabricated to include the features described herein.

The engagement member 54 may include an engagement surface 54a structured to be contacted by the cassette 30 as the cassette moves along the conveyor 22 in direction D1 when the engagement member 4 is in the first rotational position. In one or more arrangements, the engagement surface 54a may be a flat planar edge of the engagement member 54. The engagement surface 54a may have a surface finish structured to help minimize static and kinetic friction caused by the cassette 30 rubbing against the engagement surface 54a as the cassette 30 moves past the engagement member 54. Friction between the cassette 30 and the engagement surface 54a may also be reduced by minimizing the contact area between the contact surfaces.

The engagement member 54 may include a guide slot 54b. The guide slot 54b may be structured to aid in guiding rotational motion of the engagement member 54 during operation of the speed reducer 50. In one or more arrangements, the guide slot 54b may be arcuate as shown in the drawings. The guide slot 54b may have a first end 54w and a second end 54x opposite the first end 54w. Referring to FIGS. 1 and 3A, to help guide engagement member rotational motion, and with the speed reducer 50 mounted on the first frame member 24 so that the engagement member 54 resides below the first frame member 24, a bolt 98 may be passed through a hole in the first frame member 24 and through the guide slot 54b. The guide slot 54b may move with respect to the bolt 98 as the engagement member 54 rotates.

The engagement member 54 may include a retraction slot 54c. The retraction slot 54c may have a first end 54s including a first end edge 54z and a second end 54t opposite the first end 54s and including a second end edge 54p. In one or more arrangements, the retraction slot 54c may be arcuate as shown in the drawings. As shown in FIG. 2, the retraction slot 54c may be structured to receive therein a connection 58f to a retraction mechanism 58. The retraction mechanism connection 58f and the retraction slot 54c may be structured with respect to each other so that the connection 58f may freely slide along the retraction slot 54c between the slot first end 54s and the slot second end 54t as needed during operation of the speed reducer 50 and the speed reducing system 40 as described herein.

The speed reducer 50 may include a damper 56 connected to the mounting member 52. The damper 56 may be structured to bias the engagement member 54 toward the first rotational position. In one or more arrangements, the damper 56 may include a housing 56a and a piston/shaft arrangement 56b mounted in the housing 56a and structured to be extendible from (and retractable into) the housing 56a. In one or more arrangements, the damper 56 may be a spring damper including a spring member (not shown) positioned in the housing 56a. The spring member may be compressed or otherwise deflected within the housing 56a so as to generate a force on the piston/shaft arrangement 56b tending to bias the piston/shaft arrangement to an extended condition. In the extended condition, piston/shaft arrangement 56b is structured to bear against the engagement member 54 as shown in the drawings, so that biasing of the piston/shaft arrangement 56b acts to bias the engagement member 54 toward the first rotational position.

In addition, the damper 56 may be structured so that any rotation of the engagement member 54 in direction D2 due to contact of the cassette 30 with the engagement member forces the piston/shaft arrangement 56b to resiliently retract into the housing 56a against the forces generated by the damper spring member. This compression of the damper spring member dissipates the momentum of the moving cassette 30, thereby slowing the cassette. The piston/shaft arrangement 56b may remain retracted and the spring member further compressed while the cassette 30 is in contact with the engagement member 54. In order for the cassette 30 to move past the engagement member 54 when travelling along the conveyor, the cassette 30 must have sufficient momentum to cause the engagement member 54 to rotate from the first rotational positon to the second rotational position (i.e., out of the path of movement of the cassette) against the biasing force exerted by the damper 56, when the cassette 30 contacts the engagement member 54. When the cassette 30 has moved along the conveyor 22 past the engagement member 54, the damper biasing force may cause the piston/shaft arrangement 56b to push the engagement member 54 back into the first rotational position.

Factors such as the damper spring member constant and the friction at the contact interface between the engagement member 54 and the cassette 30 may be tailored to some degree as required for a particular application, to provide a relatively greater or relatively lesser degree of energy dissipation. For example, the contact friction and/or the damper spring member constant may be increased may be increased to dissipate a relatively greater amount of energy produced by a relatively higher weight traveling at a relatively lower speed, or a relatively lower weight traveling at a relatively higher speed.

The speed reducer 50 may include a retraction mechanism 58 operably connected to the engagement member 54 and structured to be operable to rotate the engagement member 54 to the second rotational position against a biasing force exerted by the damper 56 on the engagement member 54, responsive to a receipt of a control signal. The term "operably connected," as used throughout this description, can include direct or indirect connections, including connections without direct physical contact.

In one or more arrangements, the retraction mechanism 58 comprises an actuatable cylinder including a housing 58a and a shaft portion 58b structured to be extendible from the housing 58a to an extended position and retractable into the housing 58a to a retracted position responsive to the control signal. Housing 58a may be rotatably mounted to the mounting member 52 at a rotatable connection 58r. In particular arrangements, the cylinder may be pneumatic or hydraulic. In one or more arrangements, the retraction mechanism 58 may be operably connected to a supply of working fluid (such as air or hydraulic fluid) (not shown) for actuating the mechanism 58. Flow of the working fluid to and from the retraction mechanism 58 may be controlled, for example, by a valve. In particular arrangements, the retraction mechanism shaft portion 58b may be biased toward the extended position by an internal spring member or other device (not shown). The retraction mechanism 58 may be structured so that a flow of working fluid to the retraction mechanism causes the shaft portion 58b to move to the retracted position against the biasing force exerted by the damper 56. Withdrawal of the working fluid from the retraction mechanism 58 may enable the damper 56 to return the retraction mechanism shaft portion 58b to the extended position.

In one or more arrangements, the speed reducer 50 may be structured so that the engagement member 54 is freely rotatable with respect to the retraction mechanism shaft portion 58b when the retraction mechanism shaft portion is in the extended position. "Freely rotatable" means that the engagement member 54 may rotatable in any of rotational directions D2 and D3 without interference from the retraction mechanism shaft portion 58b. The shaft portion 58b may include the shaft and any elements attached to the shaft or features formed on the shaft and structured to contact the retraction slot first end edge 54z during retraction of the retraction mechanism shaft portion 58b into the housing 58a. The shaft portion 58b may also include features (such as a bolt) structured to maintain contact between the end of the shaft portion 58b and the engagement member 54 as the engagement member rotates with respect to the end of the shaft portion 58b.

The retraction mechanism shaft portion 58b may be operably connected to the engagement member 54 so that movement of the engagement member 54 to the second rotational position is caused by retraction of the shaft portion 58b to the retracted position with the shaft portion 58b in contact with a first end edge 54z of the engagement member retraction slot 54c. During normal operation of the speed reducer 50, rotation of the engagement member 54 may be controlled by contact with the cassette 30 moving in direction D1 (to rotate the engagement member in direction D2) and by the damper 56 (to rotate the engagement member 54 in direction D3). However, when contact by the moving cassette 30 fails to produce rotation of the engagement member 54, the retraction mechanism 58 may be activated as described herein to rotate the engagement member 54 out of the path of movement of the cassette 30.

In alternative arrangements, the retraction mechanism 58 may incorporate an electric motor (not shown) operably connected to the shaft portion 58b and configured to be operable to control retraction and extension of the shaft portion. In one or more arrangements described herein, the retraction mechanism 58 may include any sources of working fluid, sources of electric power (not shown), and any mechanisms and elements (such as valves, electrical switches, processors, etc.) (not shown) usable for enabling and controlling operation of the shaft portion 58b of the retraction mechanism 58 to perform the operations described herein.

Figure 5:
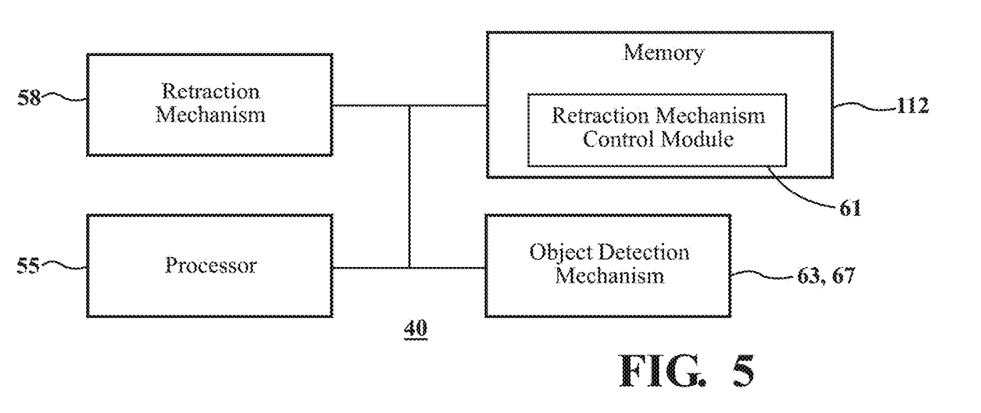
FIG. 5 is a schematic block diagram of a speed reducer system in accordance with an embodiment described herein.

Referring now to FIGS. 1 and 5, an embodiment of the speed reducer just described may be incorporated into a speed reducer system (generally designated 40) for a conveyor system. FIG. 5 is a schematic block diagram of a speed reducer system in accordance with an embodiment described herein. In one or more particular arrangements, the speed reducer system 40 may include a speed reducer 50 having a mounting member 52 and an engagement member 54 rotatably connected to the mounting member 52 and structured to be rotatable to a first rotational position and to a second rotational position, as previously described. A damper 56 may be connected to the mounting member 52 and may be structured to bias the engagement member 54 toward the first rotational position. A retraction mechanism 58 may be operably connected to the engagement member 54 and may be operable to rotate the engagement member to the second rotational position against a biasing force exerted by the damper 56 on the engagement member 54, responsive to a control signal.

The speed reducer system 40 may include a processor 55 communicably coupled to the retraction mechanism 58. In one or more arrangements, the processor 55 (or a retraction mechanism control module 61 (described in greater detail below)) may incorporate a timer function operable to track a length of time that a portion of a cassette or other object 30 moving along the conveyor 22 has resided in a predetermined volume of space 64. The timer function may be activated as soon as the object 30 enters the predetermined volume of space 64.

The system 40 may also include a memory 112 communicably coupled to the processor 55. The memory 112 is a random-access memory (RAM), read-only memory (ROM), a hard-disk drive, a flash memory, or other suitable memory for storing the retraction mechanism control module 61. In particular arrangements, the memory 112 may be embedded in the processor 55.

Memory 112 may store a retraction mechanism control module 61 configured to control operation of the retraction mechanism 58 as described herein. The retraction mechanism control module 61 can be implemented as computer-readable program code that, when executed by processor 55, implement one or more of the various control commands described herein. In some arrangements, the retraction mechanism control module 61 can be a component of the associated processor.

The module 61 can include instructions (e.g., program logic) executable by the processor 55. Generally, a module, as used herein, includes routines, programs, objects, components, data structures, and so on that perform particular tasks or implement particular data types. In further aspects, a memory generally stores the noted module. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions. In one or more arrangements, a module described herein can include artificial or computational intelligence elements, e.g., neural network, fuzzy logic or other machine learning algorithms.

The retraction mechanism control module 61 may include computer-readable instructions that when executed by the processor 55 cause the processor to generate the control signal responsive to a determination that at least a portion of an object 30 has resided in the predetermined volume of space 64 with respect to the speed reducer 50 for a period of time greater than a predetermined period of time. For purposes described herein, the retraction mechanism control module 61 may incorporate (or be in operable communication with) a timer function structured to activate as soon as an object 30 is determined to enter the predetermined volume of space 64. if and when the a predetermined period of time for the object 30 to reside within the predetermined volume of space 64 has been exceeded, the retraction mechanism control module 61 may generate a control command causing the retraction mechanism shaft portion 58*b* to retract to the retracted condition, thereby rotating the engagement member 54 into the second rotational position.

The control signal may cause the retraction mechanism shaft portion 58*b* to retract into the housing 58*a*, for example, by controlling operation of a valve, pump, or other element (not shown) managing a flow of working fluid to (or from) the retraction mechanism 58. The control module 61 may also generate another control signal configured to extend the shaft portion 58*b* (or to allow the shaft portion to extend) by controlling a flow of working fluid to (or from) the retraction mechanism 58. In an embodiment where the retraction mechanism 58 is motorized, the retraction mechanism control module 61 may control a flow of power to the motor and a direction of rotation of an output shaft of the motor.

The speed reducer system 40 may include an object detection mechanism operably connected to the retraction mechanism control module 61 and configured to detect an object 30 located in the predetermined volume of space 64.

In one or more particular arrangements, the object detection mechanism includes a sensor 63 operably connected to the retraction mechanism control module 61 and configured to detect the presence of an object 30 residing in the predetermined volume of space 64. In such arrangements, the retraction mechanism control module 61 may include computer-readable instructions that when executed by the processor 55 cause the processor to generate the control signal responsive to a determination that the sensor 63 has detected an object 30 residing in the predetermined volume of space 64 for the period of time greater than the predetermined period of time. In an embodiment of the speed reducer system 40 using a sensor 63 to detect an object 30 in the predetermined volume of space 64 as described herein, the predetermined volume of space 64 may include (or be defined with respect to) a field of view or field of detection of the sensor 63 so that the predetermined volume of space 64 (or a portion of the predetermined volume of space through which a portion of the cassette 30 will pass) intersects the sensor field of detection.

Sensor operation and/or interpretation of the sensor data may be adjusted to account for the constant, normal presence of objects (for example, static structural elements of the conveyor 22) other than the cassette 30 in the sensor field of detection. Alternatively, the sensor field of detection may be adjusted or configured to focus the field of detection on the volume of space 64 through which a portion of the cassette 30 will pass.

In one or more particular arrangements, the object detection mechanism includes a switch 67 configured to be actuatable to a closed condition by contact with an object 30 (such as the cassette) residing in the predetermined volume of space 64. In such arrangements, the retraction mechanism control module 61 may include computer-readable instructions that when executed by the processor 55 cause the processor to generate the control signal responsive to a determination that the switch 67 has been in the closed condition for the period of time greater than the predetermined period of time.

In an embodiment of the speed reducer system 40 using a switch 67 to detect an object 30 in the predetermined volume of space 64, the structure of the switch, positioning of the switch, and attachment of the switch to the conveyor 22 may be selected so that the switch is closed by contact with the cassette 30 when the cassette is positioned within the predetermined volume of space 64, and so that the switch 67 is opened by movement of the cassette 30 out of contact with the switch 67 (i.e., out of the predetermined volume of space 64).

Operation of the speed reducer system 40 will now be described.

Figure 3B:
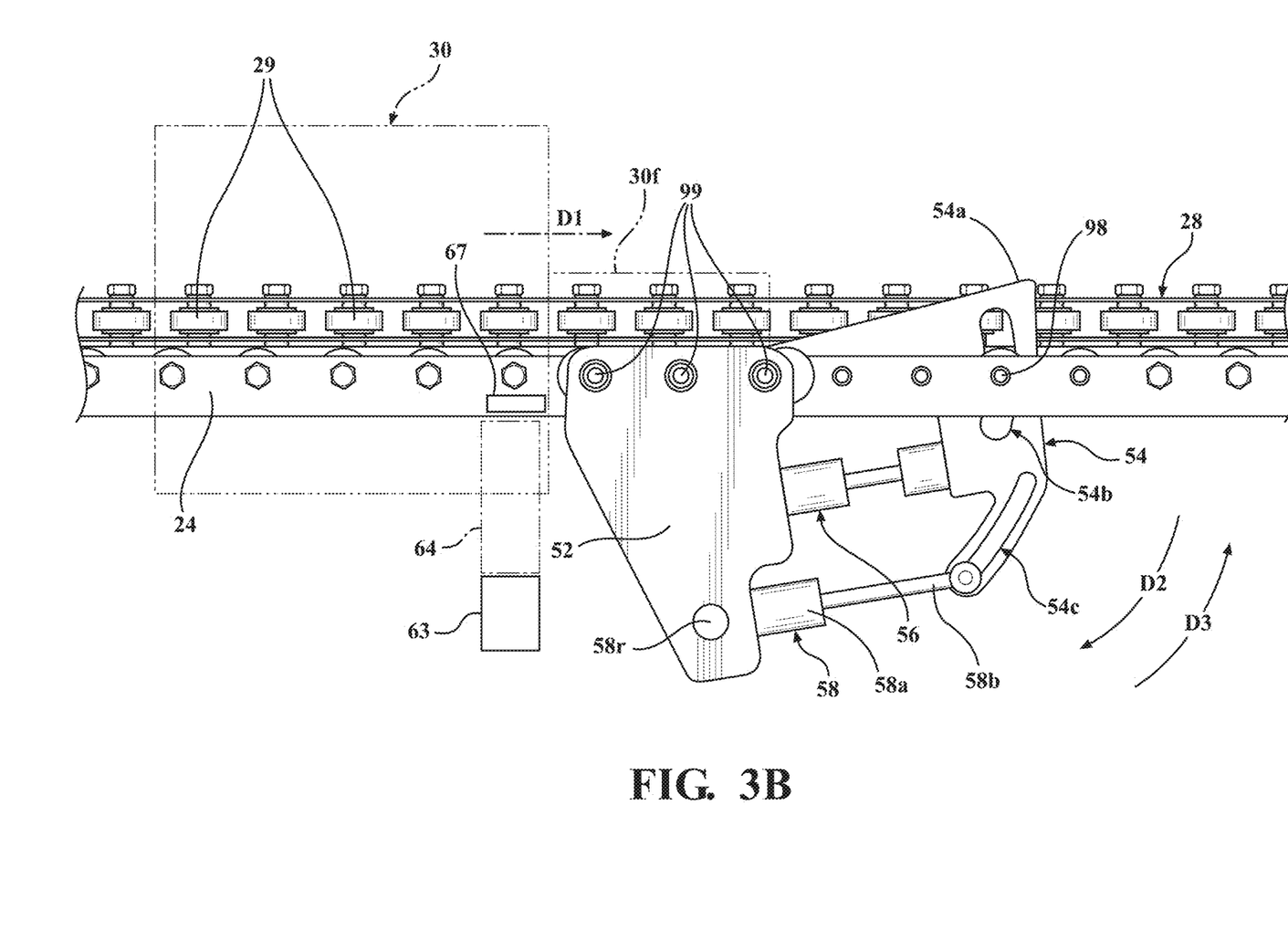
FIG. 3B is the schematic plan view of FIG. 3A showing the moving cassette at first contact of a bumper of the cassette with an engagement member of the speed reducer.
Figure 3C:
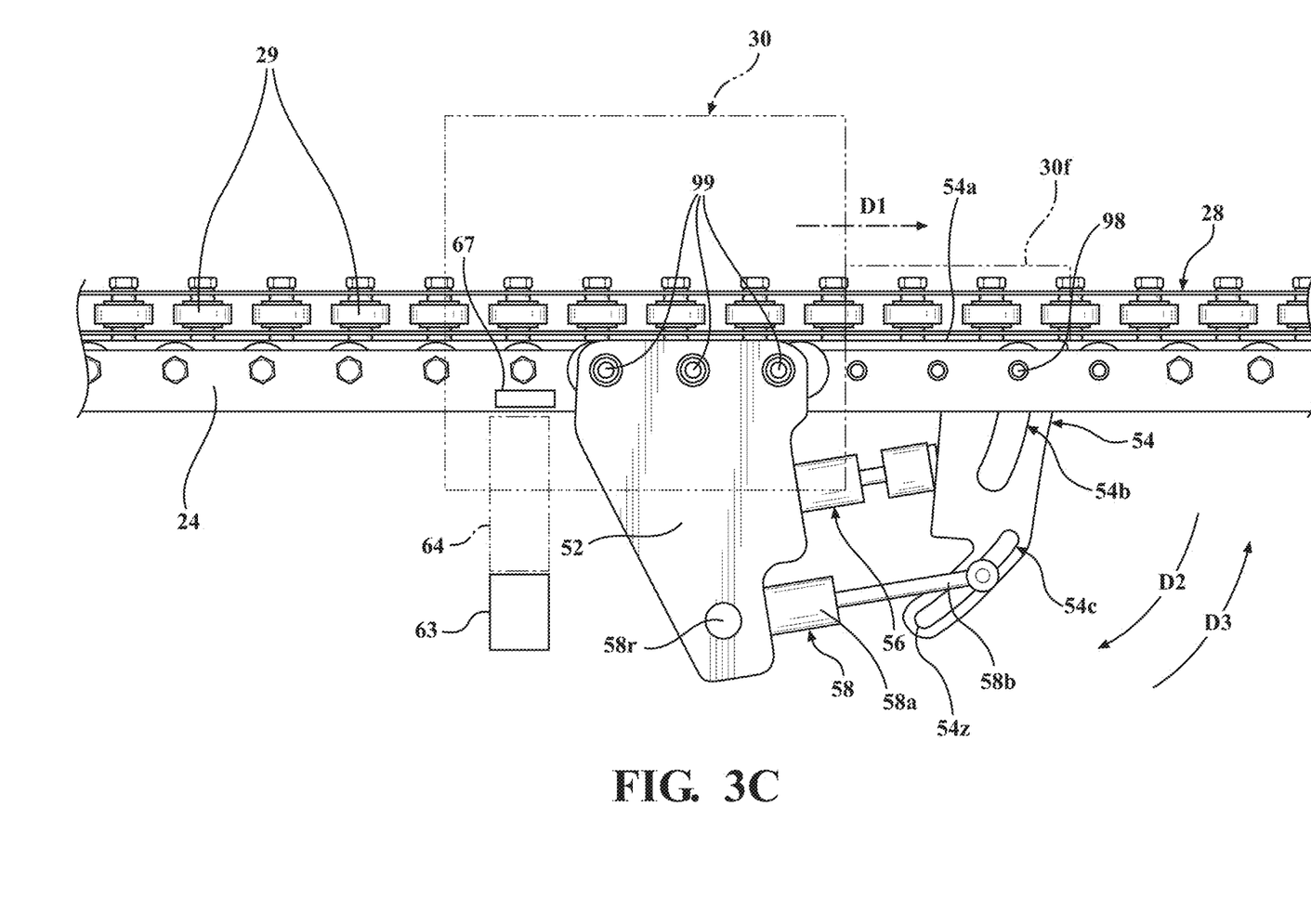
FIG. 3C is the schematic plan view of FIG. 3B showing the moving cassette proceeding along the conveyor after being slowed by contact with the engagement member and after rotation of the engagement member to the second rotational position against the damper force.

FIGS. 3A-3D illustrate normal operation of the speed reducer system 40 (i.e., without the need to activate the retraction mechanism 58). FIG. 3A is a schematic plan view of a portion of the conveyor system 20 of FIG. 1 on which an embodiment of the speed reducer 50 is mounted, showing the engagement member 54 in its first rotational position and movement of a cassette 30 along the conveyor 22 in direction D1 prior to contacting the speed reducer. FIG. 3B is the schematic plan view of FIG. 3A showing the moving cassette 30 at first contact of a bumper 30*f* of the cassette 30 with an engagement member 54 of the speed reducer 50.

After the cassette bumper 30*f* contacts the engagement member 54 (FIG. 3B), the engagement member 54 may begin to rotate out of the first rotational position against the force exerted by the damper 56. In this manner, at least a portion of the momentum of the moving cassette 30 may be dissipated in compressing the damper spring member. At this point, it may also be seen that a portion of the cassette 30 has entered the predetermined volume of space 64, which may be detected by the sensor 63 (in an embodiment of the speed reducer system including the sensor 63) or which may close the switch 67 (in an embodiment of the speed reducer system including the switch 67). This may activate the timer function to measure the total amount of time the portion of the cassette 30 resides in the predetermined volume of space 64.

FIG. 3C is the schematic plan view of FIG. 3B showing the moving cassette 30 proceeding along the conveyor 22 after being slowed by contact with the engagement member 54 and rotation of the engagement member 54 to the second rotational position against the damper force. Rotation of the engagement member 54 to the second rotational position enables the cassette 30 to proceed along the conveyor 22 past the speed reducer 50, at a slower speed than the speed at which the cassette 30 was traveling when it first contacted the engagement member 54. As the bumper 30*f* is the portion of the cassette 30 contacting the engagement member 54, contact between the bumper 30*f* and the engagement member 54 may cause the engagement member to remain in the second rotational position until the bumper 30*f* is out of contact with the engagement member 54.

Figure 3D:
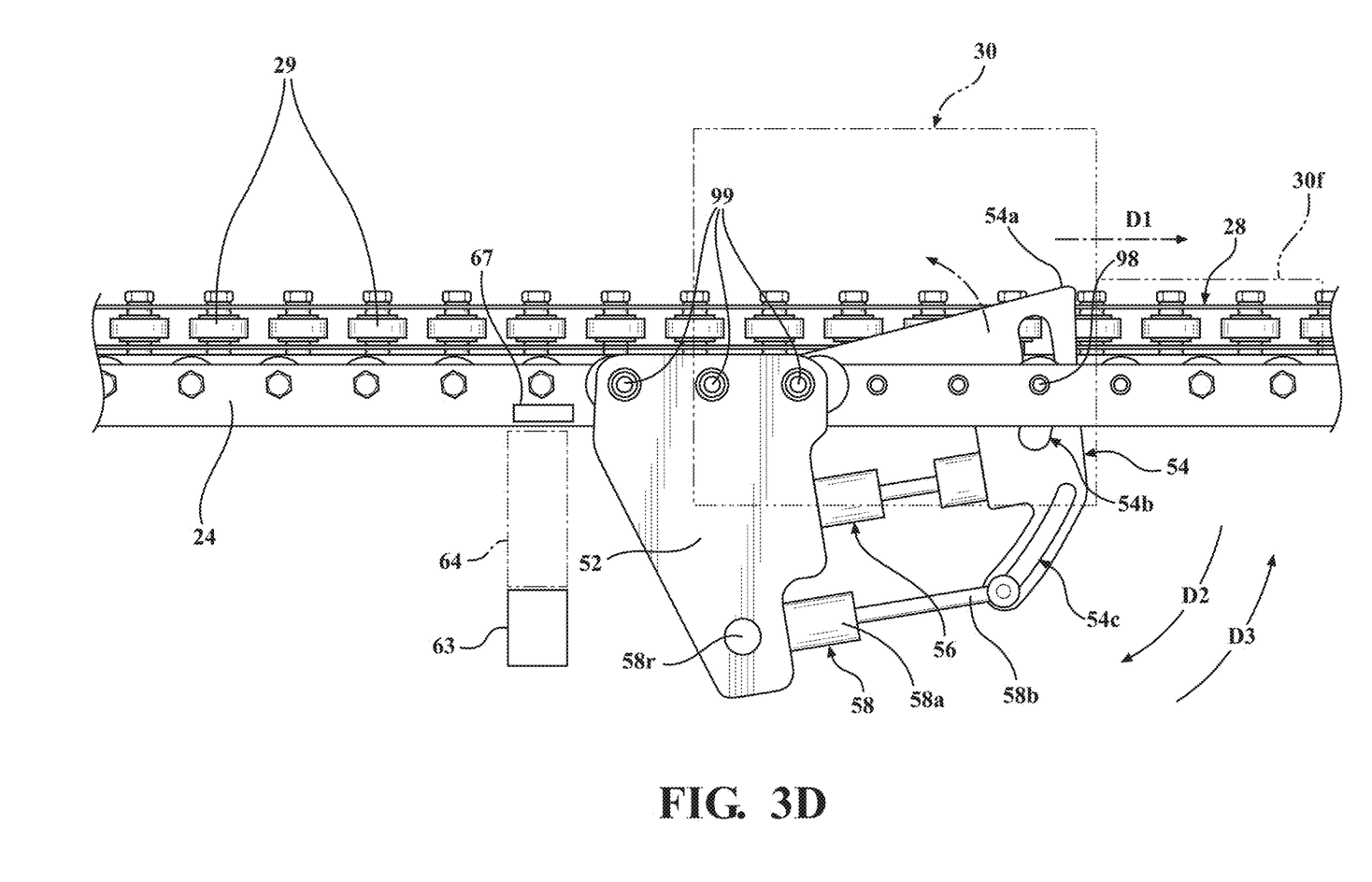
FIG. 3D is the schematic view of FIG. 3C after a bumper of the cassette has passed the engagement member and allowed the damper to rotate the engagement member back to its first rotational position.

FIG. 3D is the schematic view of FIG. 3C after the cassette bumper 30*f* has passed the engagement member 54 and allowed the damper 56 to rotate the engagement member 54 back to its first rotational position. It may also be seen that, at this point, the cassette 30 no longer resides in the predetermined volume of space 64. The retraction mechanism control module 61 may be configured to, after activation of the timer function, constantly or intermittently determine if any portion of the cassette 30 still resides in the predetermined volume of space 64. If the time that the cassette 30 has resided in the predetermined volume of space 64 has not exceeded the predetermined period of time by the time the cassette 30 exits the predetermined volume of space 64, the retraction mechanism 58 will not be activated. The predetermined period of time may be specified (give the estimated range of momenta of the cassette 30 and any load placed thereon, the damper spring member constant, and other pertinent factors) so as to allow sufficient time for the moving cassette 30 to be slowed and/or temporarily stopped, and then to begin moving again along the conveyor 22.

Figure 4A:
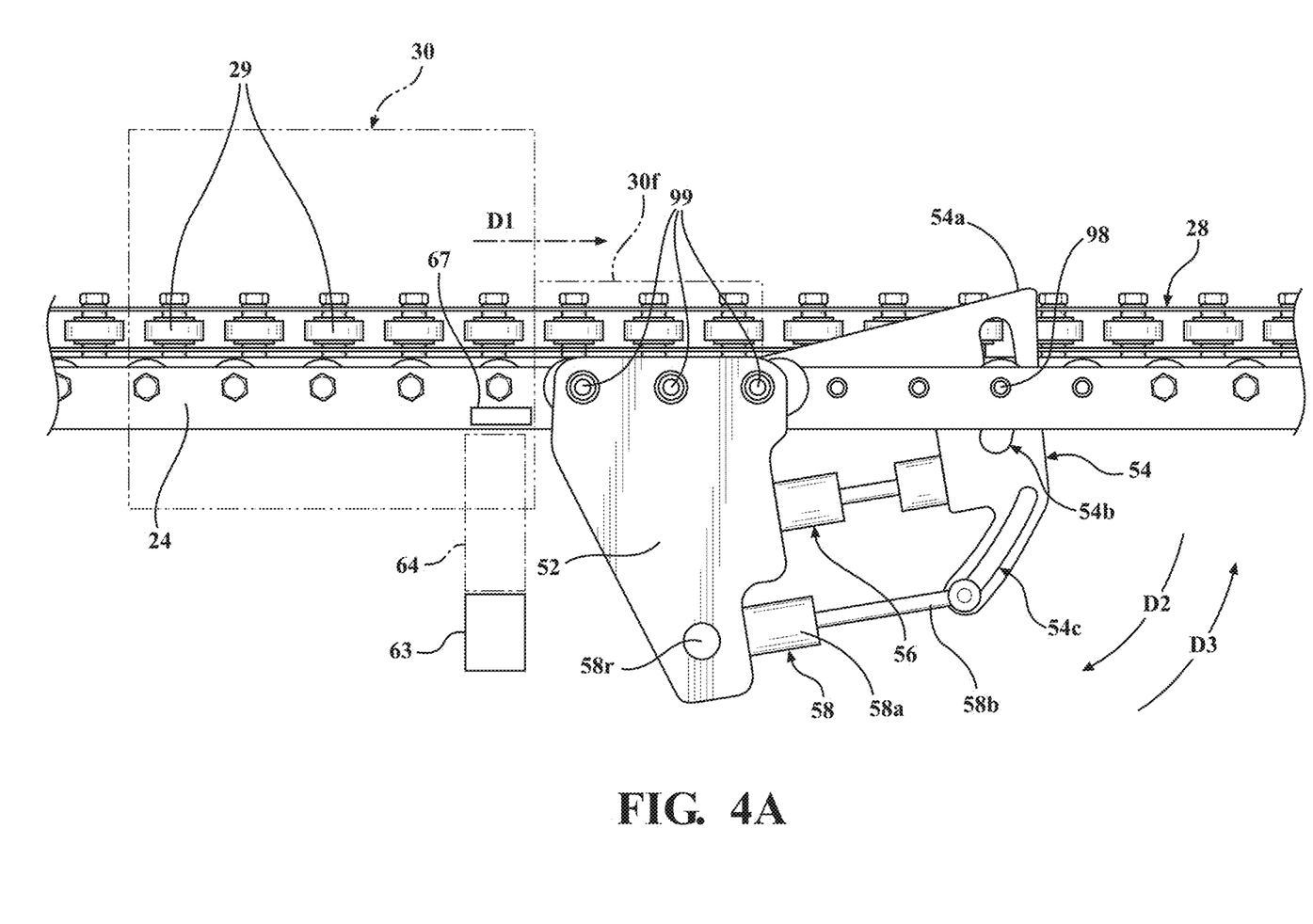
FIG. 4A is a schematic view similar to FIG. 3B, showing an instance where the cassette bumper has come into contact with the engagement member and entered a predetermined volume of space for detection of the cassette by a sensor.
Figure 4B:
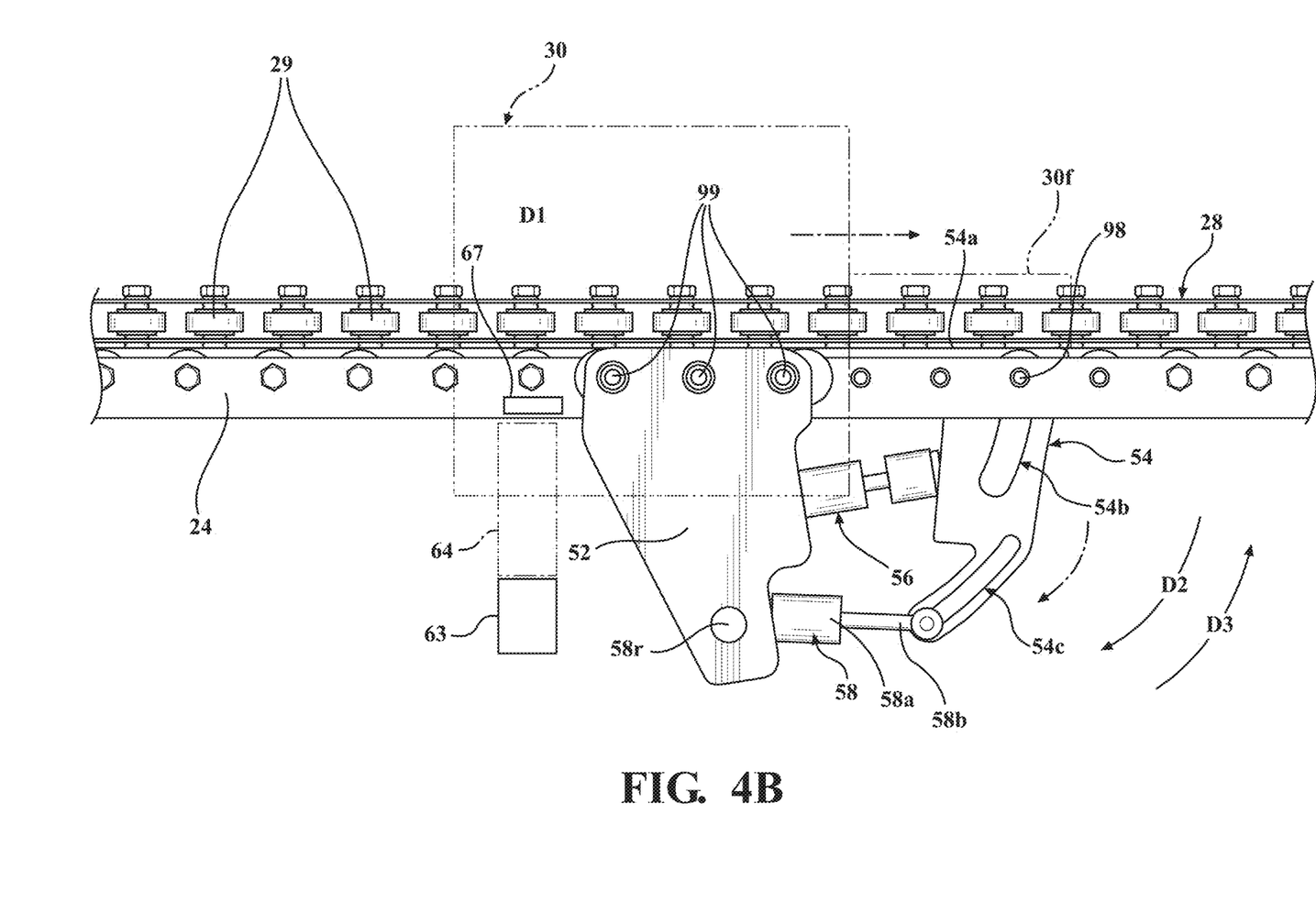
FIG. 4B is the view of FIG. 4A showing operation of the retraction mechanism to rotate the engagement member into its second rotational position.
Figure 6:
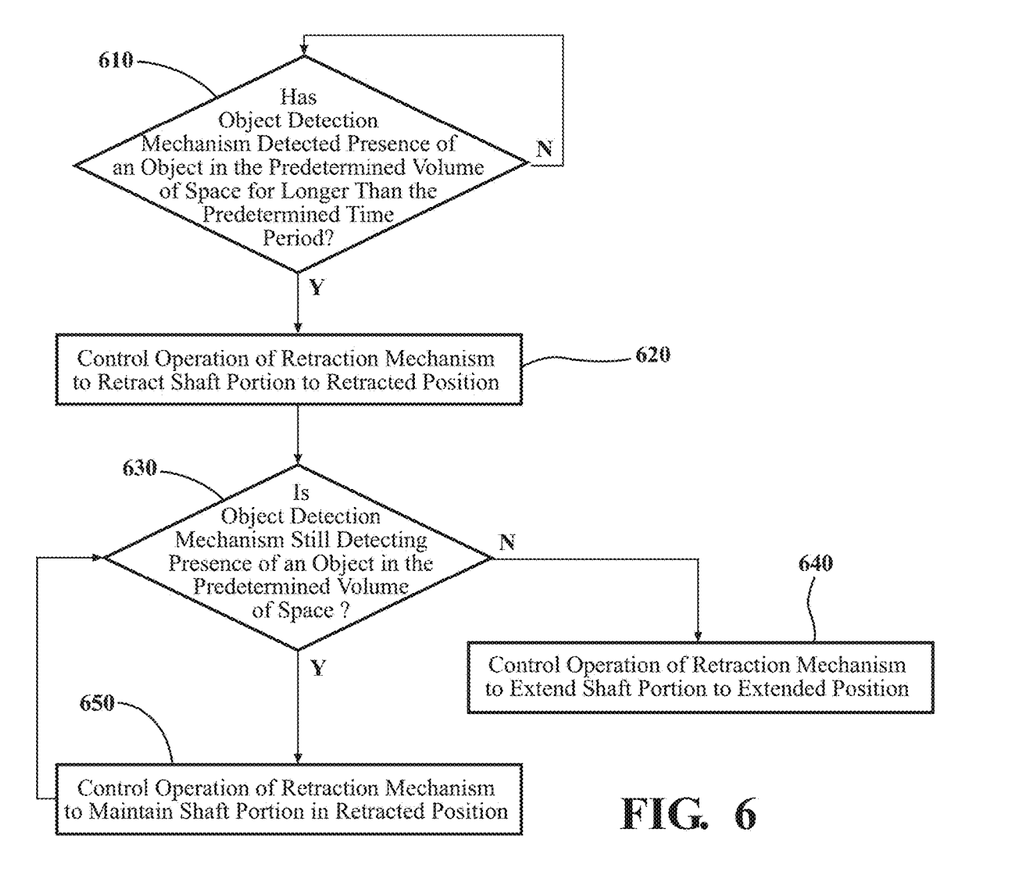
FIG. 6 is a flow diagram showing operation of the retraction mechanism of the speed reducer system.

FIGS. 4A-4C and 6 illustrate operation of the speed reducer system 40 when the retraction mechanism is used. FIG. 4A is a schematic view similar to FIG. 3B, showing an instance where the cassette bumper 30f has come into contact with the engagement member 54 and entered the predetermined volume of space 64 for detection by the sensor 63. This may activate the timing function as previously described. FIG. 6 is a flow diagram showing operation of the retraction mechanism 58 of the speed reducer system 40.

Figure 4C:
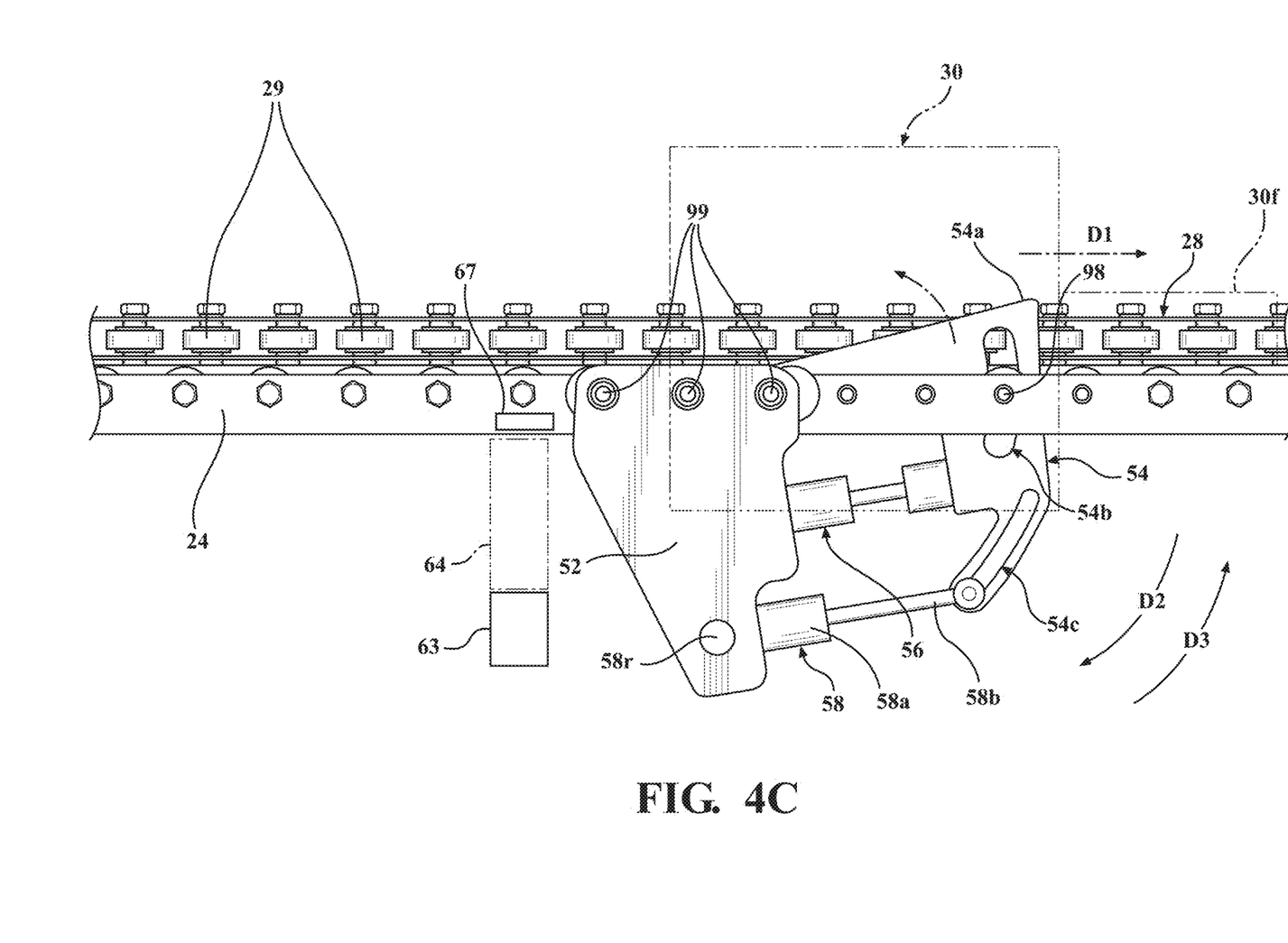
FIG. 4C is the schematic view of FIG. 4B showing renewed movement of the cassette along the conveyor after rotation of the engagement member to the second rotational position by the retraction mechanism.

In block 610 of FIG. 6, after the cassette 30 contacts the engagement member 54, the retraction mechanism control module 61 may determine if the object detection mechanism has detected the presence of an object (such as cassette 30) in the predetermined volume of space 64 for longer than the predetermined time period. In cases where the information from the object detection mechanism indicates that a portion of the cassette 30 has resided in the predetermined volume of space 64 for a time greater than the predetermined period of time, it is assumed that the momentum of the moving cassette 30 was insufficient to generate enough force to overcome the damper force and push the engagement member 54 into the second rotational position. In such cases, the retraction mechanism control module 61 may (in block 620) generate a control signal configured to control operation of the retraction mechanism 58 to retract shaft portion 58b to retracted position. FIG. 4B is the view of FIG. 4A showing operation of the retraction mechanism 58 to rotate the engagement member 54 into its second rotational position. As the shaft portion 58b retracts, the retraction mechanism connection 58f may contact the retraction slot first end edge 54z. Further retraction of the shaft portion 58b after the connection 58f contacts the retraction slot first end edge 54z causes the shaft portion 58b to pull on the first end edge 54z, thereby rotating the engagement member 54 in direction D2. This rotation may continue until the engagement member 54 is in the second rotational position, at which time the cassette 30 may start moving again along the conveyor (FIG. 4C). In this manner, the retraction mechanism 58 prevents the cassette 30 from becoming "stuck" on the conveyor 22 next to the speed reducer 50.

In block 630, after rotation of the engagement member 54 to the second rotational position, the retraction mechanism control module 61 may continue to evaluate information from the object detection mechanism to determine if the presence of the cassette/object 30 is still detected in the predetermined volume of space 64. If the presence of the cassette/object 30 is still detected in the predetermined volume of space 64 after rotation of the engagement member 54, the retraction mechanism control module 61 may (in block 650) control operation of retraction mechanism 58 to maintain shaft portion 58b in the retracted position, thereby maintaining the engagement member 54 in the second rotational position. Control may then transfer back to block 630 to redetermine if any portion of the cassette still resides in the predetermined volume of space 64. However, if the presence of the cassette/object 30 is not still detected in the predetermined volume of space 64 after rotation of the engagement member 54 to the second rotational position, the cassette/object 30 is deemed to have moved farther enough along the conveyor 22 so that the engagement member 54 will remain in the second rotational position until the cassette 30 has moved completely past the engagement member 54 (i.e., that the engagement member 54 has reached a position where the force of the damper 56 acting on the engagement member 54 will not interfere with movement of the cassette 30). The retraction mechanism control module 61 may then (in block 640) control operation of the retraction mechanism 58 to extend the shaft portion 58b to its extended position. This allows the damper 56 to return the engagement member 54 to the first rotational position.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module, as envisioned by the present disclosure, is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A speed reducer system for a conveyor system, the system comprising:
    a speed reducer including:
    a mounting member;
    an engagement member rotatably connected to the mounting member and structured to be rotatable to a first rotational position and to a second rotational position;
    a damper connected to the mounting member and structured to bias the engagement member toward the first rotational position;
    a retraction mechanism operably connected to the engagement member and structured to be operable to rotate the engagement member to the second rotational position against a biasing force exerted by the damper on the engagement member, responsive to a control signal;
    a processor communicably coupled to the retraction mechanism; and
    a memory communicably coupled to the processor and storing a retraction mechanism control module including computer-readable instructions that when executed by the processor cause the processor to generate the control signal responsive to a determination that at least a portion of an object supported by the conveyor for movement therealong has resided in a predetermined volume of space with respect to the speed reducer for a period of time greater than a predetermined period of time.

2. The system of claim 1 further comprising an object detection mechanism operably connected to the retraction mechanism control module and configured to detect an object located in the predetermined volume of space.

3. The system of claim 2 wherein the object detection mechanism comprises a switch configured to be actuatable to a closed condition by contact with an object residing in the predetermined volume of space, and wherein the retraction mechanism control module includes computer-readable instructions that when executed by the processor cause the processor to generate the control signal responsive to a determination that the switch has been in the closed condition for the period of time greater than the predetermined period of time.

4. The system of claim 2 wherein the object detection mechanism comprises a sensor operably connected to the retraction mechanism and configured to detect an object residing in the predetermined volume of space, and wherein the retraction mechanism control module includes computer-readable instructions that when executed by the processor cause the processor to generate the control signal responsive to a determination that the sensor has detected an object residing in the predetermined volume of space for the period of time greater than the predetermined period of time.

5. A speed reducer for a conveyor system, the speed reducer comprising:
    a mounting member;
    an engagement member rotatably connected to the mounting member and structured to be rotatable to a first rotational position and to a second rotational position;
    a damper connected to the mounting member and structured to exert a force biasing the engagement member to the first rotational position; and
    a retraction mechanism operably connected to the engagement member and including a cylinder having a housing and a shaft portion extendible from the housing to an extended position, wherein the engagement member is freely rotatable with respect to the shaft portion when the shaft portion is in the extended position.

6. The speed reducer of claim 5 wherein the engagement member includes a retraction slot formed therein, wherein the is retractable into the housing to a retracted position, and wherein the shaft portion is operably connected to the engagement member so that movement of the engagement member to the second rotational position is caused by retraction of the shaft portion to the retracted position with the shaft portion in contact with a first end edge of the engagement member retraction slot.

7. A computer-implemented method of controlling a speed of an object moving along a conveyor, comprising a step of positioning a speed reducer in a path of movement of the object, the speed reducer including an engagement member, the engagement member being rotatable to a first rotational position in which the portion of the engagement member is in the path of movement, and to a second rotational position in which the engagement member is out of the path of movement, the engagement member being operably connected to a damper structured to exert a force resisting rotation of the engagement member out of the first rotational position, the engagement member being configured to rotate out of the first rotational position responsive to contact of the moving object with the portion of engagement member, thereby reducing the speed of the moving object, when a momentum of the moving object is sufficient to cause rotation of the engagement member against the force exerted by the damper, the engagement member also being operably connected to a retraction mechanism configured to rotate the engagement member to the second rotational position against a force exerted by the damper on the engagement member, after movement of the object along the conveyor stops, thereby enabling further movement of the object along the conveyor, when the momentum of the object contacting the engagement member is insufficient to cause rotation of the engagement member to the second rotational position against the force exerted by the damper.

8. The method of claim 7 wherein the engagement member includes a retraction slot formed therein, wherein the retraction mechanism comprises an actuatable cylinder including a housing and a shaft portion structured to be extendible from the housing to an extended position and retractable into the housing to a retracted position responsive to a control signal, and wherein the shaft portion is operably connected to the engagement member so that movement of the engagement member to the second rotational position is caused by retraction of the shaft portion to the retracted position with the shaft portion in contact with a first end edge of the engagement member retraction slot.

9. The method of claim 7 wherein the speed reducer is structured so that the engagement member is freely rotatable with respect to the retraction mechanism shaft portion when the shaft portion is in the extended position.

* * * * *

UNITED STATES PATENT AND TRADEMARK OFFICE
CERTIFICATE OF CORRECTION

PATENT NO. : 11,814,251 B1
APPLICATION NO. : 17/828716
DATED : November 14, 2023
INVENTOR(S) : T. J. Maier It is certified that error appears in the above-identified patent and that said Letters Patent is hereby corrected as shown below:

In the Claims

Claim 6, Column 14, Line 46, please add "shaft portion" before "is retractable".

Signed and Sealed this
Fifth Day of March, 2024

Katherine Kelly Vidal
*Director of the United States Patent and Trademark Office*